US009676560B2

(12) United States Patent
Senn et al.

(10) Patent No.: US 9,676,560 B2
(45) Date of Patent: Jun. 13, 2017

(54) APPARATUS AND METHOD FOR SERVICING CONVEYOR ELEMENTS IN A CONTAINER TREATMENT SYSTEM

(71) Applicant: KRONES AG, Neutraubling (DE)

(72) Inventors: Konrad Senn, Regensburg (DE); Ralf Walter, Zeitlarn (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 14/916,585

(22) PCT Filed: Aug. 13, 2014

(86) PCT No.: PCT/EP2014/067295
§ 371 (c)(1),
(2) Date: Mar. 4, 2016

(87) PCT Pub. No.: WO2015/036194
PCT Pub. Date: Mar. 19, 2015

(65) Prior Publication Data
US 2016/0194157 A1 Jul. 7, 2016

(30) Foreign Application Priority Data
Sep. 13, 2013 (DE) .......................... 10 2013 218 394

(51) Int. Cl.
*G06F 7/00* (2006.01)
*B65G 35/00* (2006.01)
(Continued)

(52) U.S. Cl.
CPC ............. *B65G 35/00* (2013.01); *B65G 35/06* (2013.01); *B65G 37/02* (2013.01); *B65G 43/00* (2013.01);
(Continued)

(58) Field of Classification Search
USPC .......................................................... 700/218
See application file for complete search history.

(56) References Cited

U.S. PATENT DOCUMENTS

2003/0149509 A1* 8/2003 Udou ...................... B65G 37/02
700/213
2006/0230975 A1 10/2006 Shiwaku
2013/0026005 A1* 1/2013 Senn ..................... B65G 47/082
198/465.2

FOREIGN PATENT DOCUMENTS

CH 677469 A5 5/1991
DE 10040531 A1 2/2002
(Continued)

OTHER PUBLICATIONS

International Search Report for Application No. PCT/EP2014/067295, dated Jan. 13, 2015.

*Primary Examiner* — Kyle Logan
(74) *Attorney, Agent, or Firm* — Marshall, Gerstein & Borun LLP

(57) ABSTRACT

A conveyor arrangement for conveying containers in a container treatment system, including a conveyor track, at least one conveyor element movably arranged on the conveyor track and used for conveying one or a plurality of containers, a conveyor element servicing device connected to the conveyor track, and an open-loop and/or closed-loop control unit, where the conveyor track and the conveyor element are configured such that the conveyor element can be guided along the conveyor track in an individually controllable manner by means of the open-loop and/or closed-loop control unit, and where the open-loop and/or closed-loop control unit is configured to supply the conveyor element to the servicing device depending on at least one state parameter of the conveyor element.

26 Claims, 6 Drawing Sheets

(51) Int. Cl.
    *B65G 35/06* (2006.01)
    *B65G 37/02* (2006.01)
    *B65G 54/02* (2006.01)
    *B65G 43/00* (2006.01)
    *B65G 45/02* (2006.01)
    *B65G 45/10* (2006.01)

(52) U.S. Cl.
    CPC ............ *B65G 45/02* (2013.01); *B65G 45/10* (2013.01); *B65G 54/02* (2013.01)

(56) References Cited

FOREIGN PATENT DOCUMENTS

| | | |
|---|---|---|
| DE | 102004048515 A1 | 4/2006 |
| DE | 102012201059 A1 | 7/2013 |
| JP | 2011037623 A | 2/2011 |
| JP | 2012101870 A | 5/2012 |
| JP | 2012239334 A | 12/2012 |
| WO | WO-2008136659 A1 | 11/2008 |

\* cited by examiner

APPARATUS AND METHOD FOR SERVICING CONVEYOR ELEMENTS IN A CONTAINER TREATMENT SYSTEM

CROSS-REFERENCE TO RELATED APPLICATION

The present application is the United States national phase of International Patent Application No. PCT/EP2014/067295, filed Aug. 13, 2014, which application claims to German Application No. 10 2013 218 394.1, filed Sep. 13, 2013. The priority application is hereby incorporated by reference.

FIELD OF THE DISCLOSURE

The present disclosure relates to an apparatus and a method for servicing individually controllable conveyor elements for conveying containers, in particular bottles or cans, in a system for treating the containers.

BACKGROUND

In container treatment systems, containers, such as bottles, cans etc., are treated in one or a plurality of successive processing steps. In so doing, the processing steps or working steps are generally carried out in separate treatment units, which may e.g. be combined as modules of a joint system concept. In order to reduce costs for the acquisition and the operation of the system, interfaces for controlling the system, for media supply or the like, are normally standardized so that treatment units of different types and/or production capacities can be combined more easily. A container treatment system for plastic bottles consisting e.g. of polyethylene terephthalate (PET), polypropylene (PEP), etc., may comprise e.g. a heating device for heating the parisons, a stretch blow molding device for expanding and stretching the parisons so as to obtain plastic bottles, a cleaning device, a labeler, a filler, a sorter, a packaging device, a sterilization device, an inspection device, a tempering device, a cooling device, a coating device, a buffer device, etc., as separate, modular treatment units. In the prior art, the individual treatment units, which carry out successive processing steps, are generally connected in series one after the other, and one or a plurality of conveying devices conveys the containers from the treatment units to the respective treatment units following downstream thereof.

The execution of successive processing steps by the separate treatment units of the system as well as the conveyance between the individual treatment units thus correspond to the known principle of assembly-line processing, where it is accomplished, by means of suitable control processes concerning the processing duration of the individual processing steps and/or the quantity of containers conveyed per unit time from one treatment unit to the next, that containers to be treated pass continuously through the successively arranged treatment units. In systems known from the prior art, the conveyance of the containers between the treatment units is often realized by means of a plurality of separate conveyor elements in the form of carriers, which pick up the containers or parisons by means of suitable holding devices, e.g. specially formed gripper elements, at a pick-up location, convey them through the series of successive treatment units, and deliver them finally at a delivery location. The containers are here generally transferred to the plurality of conveyor elements by suitably configured feed conveyors at the pick-up locations and are correspondingly transferred from the plurality of conveyor elements to suitably configured discharge conveyors at the delivery locations. The process line consisting of feed conveyors, container treatment units, discharge conveyors and the parts of the conveyor arrangement connecting these components is normally not provided with any turnout possibilities for the conveyor elements, so that a single damaged conveyor element may stop the entire process line.

In order to operate a conveyor arrangement of such a container treatment system with individually controllable conveyor elements, a plurality of conveyor elements is required for moving the plurality of containers to be treated, which are in engagement with the container treatment system. For keeping the costs for the conveyor elements and thus for the entire container treatment system as low as possible, it is important to use for the conveyor elements a guide and bearing system that is available at the lowest possible price. It must, however, also be guaranteed that, as far as possible, no damaged conveyor element will interfere with the flow of conveyor elements along the process line. To this end, the conveyor elements used must always be maintained in a technically perfect state. Therefore, damaged conveyor elements or wear phenomena of the conveyor elements have to be detected as early as possible. Manual examination and servicing of the conveyor elements by the operating staff is very complicated and time and cost intensive.

SUMMARY OF THE DISCLOSURE

Hence, it is one aspect of the present disclosure to provide a device and a method for automatically servicing the conveyor elements of a conveyor device in a container treatment system, which overcome the above mentioned drawbacks and which, in particular, avoid a standstill of the process line caused by a defective conveyor element. Quite generally, it is another aspect of the present disclosure to reduce the installation and operation costs of a conveyor arrangement used for conveying containers in a container treatment system and comprising a plurality of individually controllable conveyor elements.

For trouble-free operation of a container treatment system, it is additionally important to precisely know the position of each individual conveyor element along the conveyor track, so that an open-loop and/or closed-loop control circuit belonging to the conveyor arrangement will be able to guide the individual conveyor elements along the conveyor track according to the processing rate of the respective container treatment unit and with the predetermined spacing. Moreover, also the load condition of the conveyor elements and the treatment condition of the conveyed containers may be of importance for trouble-free control. To this end, the individual conveyor elements may be provided with respective unequivocal identification units, which can be read by one or a plurality of suitable identification detection devices along the conveyor track when the conveyor elements pass by. Alternatively, the prior art also uses non-distinguishable conveyor elements having numbers assigned thereto by the control unit of the open-loop and/or closed-loop control circuit exclusively on the basis of their sequence along the conveyor track during initialization of the conveyor arrangement, in particular during powering-up of the container treatment system.

However, when the control voltage of the open-loop and/or closed-loop control circuit is switched off, in particular in the case of a power failure or when the entire container treatment system is shut down, the conveyor elements lose their absolute position along the conveyor track and can therefore no longer be monitored. In particular, the control unit of the open-loop and/or closed-loop control circuit will normally lose, in the case of an interruption of its power supply, any information on the position and/or the sequence of conveyor elements along the conveyor track. Product tracking is therefore no longer possible. In addition, an initialization of the conveyor arrangement during a future restart of the container treatment system is rendered much more complicated and much more error-prone, since it may be impossible to recognize part of the conveyor elements. Even if unequivocal identification units are provided on the conveyor elements, an identification, especially with respect to the sequence of conveyor elements, a condition of load and/or a treatment condition of the conveyed container, can only take place when a respective identification detection unit is passed by. An uncontrolled residual movement of the conveyor elements resulting from the inertia of the latter may, moreover, lead to a relative displacement of the conveyor elements along the conveyor track when the container treatment system is switched off and/or when the power supply fails. A desired spacing is therefore no longer given when the system is restarted.

Hence, it is another aspect of the present disclosure to simplify and shorten an initialization process when a container treatment system and its conveyor arrangement are restarted after the power supply of the conveyor arrangement has been switched off or after a failure of the same.

The above-mentioned and other aspects of the disclosure are achieved by a conveyor arrangement for conveying containers in a container treatment system, including a conveyor track, at least one conveyor element movably arranged on the conveyor track and used for conveying one or a plurality of containers, a conveyor element servicing device connected to the conveyor track, and an open-loop and/or closed-loop control unit, where the conveyor track and the conveyor element are configured such that the conveyor element can be guided along the conveyor track in an individually controllable manner by means of the open-loop and/or closed-loop control unit, and where the open-loop and/or closed-loop control unit is configured to supply the conveyor element to the servicing device depending on at least one state parameter of the conveyor element.

Conveyor arrangements are here and in the following understood as conveying units comprising conveyor elements used for the containers and conveyed in a closed circuit. This, however, does not exclude that at least subsections of the conveyor arrangement do not define a closed circuit.

According to the present disclosure, the conveyor arrangement comprises at least one conveyor element for conveying one or a plurality of containers. In particular, the conveyor arrangement may comprise a plurality of individually controllable conveyor elements that are movably arranged on a conveyor track of the conveyor arrangement. The plurality of conveyor elements may comprise a plurality of identically configured conveyor elements, which can be moved along the conveyor track individually and independently of one another. This, however, does not exclude that individual conveyor elements differ among one another with respect to one or a plurality of features. In particular, the plurality of conveyor elements may comprise at least two groups of respective identically configured conveyor elements, which differ from one another with respect to at least one feature, e.g. a functional element, such as a gripper element and/or a structural design of the reaction element described hereinbelow. The number of conveyor elements on the conveyor track is, in principle, arbitrary and is only limited by the length of the conveyor track as long as at least one conveyor element is provided. For picking up the at least one container at a pick-up location and for delivering the containers at a delivery location, the conveyor elements may be provided with a suitable holding device, e.g. in the form of a gripper element. The gripper element may be configured such that it is passively or actively controllable. In particular, gripper elements used for gripping the neck area of the containers in form-fit or force-fit engagement therewith, e.g. during the so-called neck handling of plastic bottles, are imaginable, the thus held container being, in the case of form-fit gripping, supported in the gripper element so as to be rotatable about its longitudinal axis. In addition, the gripper element may be configured such that it is pivotable and/or vertically adjustable.

Containers in the sense of the present disclosure are especially beverage bottles, but also other containers for foodstuffs, medicaments, sanitary products, cleaning agents or the like, such as cans, glass bottles or other glass containers having a cap, packages on the basis of cardboard or composite materials, tetrapacks or the like. As regards containers made of plastic material, also semifinished products, in particular parisons for stretch blow molding of containers, are imaginable. In addition, containers in the sense of the present disclosure are also assorted packs comprising a plurality of containers.

The conveyor elements may be configured as a runner, a puck, a slide, a shuttle or the like, which are moved by interaction with the conveyor track. Each conveyor element can here, according to requirements, be accelerated, decelerated, moved with a constant speed or fully stopped temporarily on the conveyor track. Thus, a variable displacement-time profile of each individual conveyor element can be realized by individually controlling the respective conveyor elements. In addition, the at least one conveyor element may comprise a distinct identification unit, e.g. in the form of a bar code, a readable memory chip, a printed-on, glued-on and/or engraved alphanumeric code, etc., with one or a plurality of suitable identification detection devices provided along the conveyor track allowing an identification of the conveyor element which moves past the respective identification detection device. The identification unit of the conveyor element can especially be used for accurately guiding the conveyor element e.g. to a specific delivery location.

The shape of the conveyor track is, in principle, arbitrary. In particular, the conveyor track may be substantially closed, substantially closed meaning here that the conveyor track provides at least one closed path for the conveyor elements. According to one embodiment, this can be realized by providing a feedback line as part of the conveyor track, said feedback line allowing the conveyor elements to be returned from a delivery location to a pick-up location. The conveyor track may, however, also be at least partially open such that at least a subsection of the conveyor track is configured as a dead end for the conveyor elements. Returning the conveyor elements can here be made possible by reversing the direction of movement. In particular, such a dead end may terminate at one of the delivery locations.

According to the present disclosure, the conveyor track and the conveyor elements are configured such that the conveyor element can be guided along the conveyor track in an individually controllable manner by means of an open-loop and/or closed-loop control unit of the conveyor arrangement. For guiding the at least one conveyor element while moving the conveyor element along the conveyor track, the conveyor track may be provided with a guide rail and/or a guide channel. Accordingly, the conveyor element may be provided with a complementary guide channel, a complementary guide element, e.g. a guide pin, and/or one or a plurality of suitably arranged guide rollers running, e.g. by means of a wheel flange, on the guide rail of the conveyor track. A large number of alternative embodiments, making e.g. use of the plain bearing described hereinbelow, is here imaginable. By providing a guide rail on the conveyor track, low-friction sliding of the conveyor elements along the conveyor track can be allowed. In addition, the conveyor track may have a running surface on which respective support elements, e.g. support rollers, may roll or slide.

According to the present disclosure, the at least one conveyor element is guided along the conveyor track by means of an open-loop and/or closed-loop control unit, e.g. in the form of a process computer. The open-loop and/or closed-loop control unit may here be part of an open-loop and/or closed-loop control unit of the container treatment system or it may be configured as a separate open-loop and/or closed-loop control unit of the conveyor arrangement. In addition, the open-loop and/or closed-loop control unit may be realized by a central open-loop and/or closed-loop control unit and/or by open-loop and/or closed-loop control units arranged off-center on the conveyor elements. Furthermore, the one or the plurality of open-loop and/or closed-loop control units may be configured as memory-programmable logic control unit(s) PLC.

According to the present disclosure, the conveyor arrangement comprises a servicing device for the at least one conveyor element, said servicing device being connected to the conveyor track. The servicing device may here be connected to the conveyor track via a secondary line of the conveyor track (see below), one of the conveyor units known in the prior art, such as e.g. a conveyor belt or a conveyor chain, or a removal device, which is configured such that it is capable of removing individual conveyor elements from a stream of conveyor elements along the conveyor track and supplying them to the servicing device. Such a removal device may be realized e.g. in the form of a gripper element or a gripper arm. A complementary feedback device may be configured for re-introducing conveyor elements from the servicing device back into the stream of conveyor elements along the conveyor track. In the servicing device the defective conveyor elements can be serviced manually by the operating staff. In the simplest case, the servicing device may be configured as a part of the conveyor track which, from the technical point of view, does not substantially differ from the rest of the conveyor track, but is defined as servicing device only insofar as it is easily accessible and/or provided with a color mark and/or marking by means of an alphanumeric code. In this case, an output unit of the container treatment system, e.g. in the form of a touchscreen or display, may indicate whether and, if so, in which servicing device a conveyor element to be serviced is present, so that the operating staff can read where manual servicing of the conveyor element is to be executed. Alternatively or additionally, the conveyor elements may be serviced in the servicing device semi-automatically or fully automatically (see below). The servicing device may here be configured for allowing servicing of more than one conveyor element at a time. In particular, the servicing device may be configured for allowing a plurality of conveyor elements to be simultaneously subjected to the same servicing process. Possible servicing processes comprise cleaning of the conveyor element, sterilizing the conveyor element, applying a lubricant to running surfaces and/or bearing points of the conveyor element, repairing or replacing wearing parts and/or format parts of the conveyor element as well as reconfiguring functional elements of the conveyor element (see below).

According to the present disclosure, the open-loop and/or closed-loop control unit is configured to supply the conveyor element to the servicing device depending on at least one state parameter of the conveyor element. In addition, the open-loop and/or closed-loop control unit may be configured for controlling the execution of one or more servicing processes at the conveyor element in the servicing device.

The at least one state parameter of the conveyor element may comprise an individual state parameter of the conveyor element, i.e. a state parameter monitored for each conveyor element separately and/or a general state parameter for a group of the conveyor elements of the conveyor arrangement or for said conveyor elements in their entirety. State parameters suitable for use in this context are especially the service life of the conveyor element or of the plurality of conveyor elements since the last servicing process or since the putting into operation of the conveyor arrangement. To this end, the open-loop and/or closed-loop control unit may be configured for monitoring the service life of the individual conveyor elements or of the plurality of conveyor elements e.g. by means of a chronometer, so as to supply the conveyor element or the conveyor elements to the servicing device when a predetermined maximum service life has been reached. In particular, the open-loop and/or closed-loop control unit may here adequately control a part of the conveyor track, the conveyor unit or the removal device, by means of which the conveyor element is supplied to the servicing device.

For monitoring individual state parameters of individual conveyor elements by the open-loop and/or closed-loop control unit, the conveyor elements may be configured such that they can be identified unequivocally by the open-loop and/or closed-loop control unit. To this end, the individual conveyor elements may be provided with respective unequivocal identification units, which, as has already been mentioned hereinbefore, can be read by one or by a plurality of suitable identification detection devices along the conveyor track when the respective conveyor elements pass by. Alternatively, the prior art also uses non-distinguishable conveyor elements having numbers assigned thereto by the open-loop and/or closed-loop control unit exclusively on the basis of their sequence along the conveyor track during initialization of the conveyor arrangement, in particular during powering-up of the container treatment system. The open-loop and/or closed-loop control unit monitors here the sequence and/or positions of the conveyor elements along the conveyor track by means of a memory unit. The open-loop and/or closed-loop control unit may here be configured as part of an energy-buffered open-loop and/or closed-loop control circuit such that it will store the positions and the state parameters of the individual conveyor elements also in the event of an abnormal stop of the container treatment system, such as a power failure, or in an emergency situation (see below). Energy-buffering of the open-loop and/or closed-loop control circuit may be realized e.g. via an uninterruptible power supply (UPS), a battery or the like. In addition, the respective data may be stored, in the case of longer power failures, in a non-volatile storage medium, such as a hard disk, a flash memory card or an optical storage medium, and read when the container treatment system is restarted. Internally, the open-loop and/or closed-loop control unit assigns at least one individual state parameter, e.g. the service life of the respective conveyor element, to each of the conveyor elements, so as to supply, if necessary, individual conveyor elements to the servicing device depending on their individual state parameters. The assignment and monitoring of individual state parameters of the individual conveyor elements has here the advantage that not all the conveyor elements are supplied to the servicing device at the same time, which would result in a temporary standstill of the container treatment system and therefore in a loss of valuable production time. Instead, individual conveyor elements can, if necessary, be discharged or removed from the stream of conveyor elements by means of the open-loop and/or closed-loop control unit, and serviced in the servicing device independently of the other conveyor elements while the production process continues.

When unequivocal identification units are provided, e.g. in the form of a bar code, readable memory chips, a printed-on, glued-on and/or engraved alphanumeric code, etc., individual state parameters of the conveyor elements can be monitored continuously by the open-loop and/or closed-loop control unit, i.e. also beyond a shut-down of the container treatment system. To this end, the open-loop and/or closed-loop control unit may comprise a memory unit including a non-volatile storage medium, which, when the container treatment system is being shut down, can be used for storing the values of the individual state parameters and, optionally, the positions of the conveyor elements along the conveyor track together with the codes unequivocally identifying the conveyor elements. The open-loop and/or closed-loop control unit will then be able to read the stored values from the memory unit as part of an initialization routine, when the container treatment system is being restarted, and monitor them during operation of the conveyor arrangement. As has already been outlined hereinbefore, the individual conveyor elements can, especially as part of an initialization routine, unequivocally be assigned to the stored individual state parameters through reading of the respective identification units when the conveyor elements move past one or a plurality of suitable identification detection devices.

According to an alternative embodiment, the identification units of the conveyor elements may comprise individual memory units in which the individual values of the at least one state parameter of the conveyor element can be stored by the open-loop and/or closed-loop control unit by means of one or a plurality of writing devices arranged along the conveyor track. Such a writing process may be triggered e.g. by a movement past the respective writing device or as part of an examination process by means of an examination device (as described hereinbelow). The stored values can subsequently be read and monitored by the open-loop and/or closed-loop control unit, especially during initialization of the conveyor arrangement, by means of one or a plurality of reading devices configured for this purpose, especially by means of the above described identification detection devices. When the individual state parameters are stored in non-volatile storage media of the separate memory units of the individual conveyor elements, the value of the at least one state parameter will be preserved also beyond a shutdown of the container treatment system. Hence, individual conveyor elements can temporarily be discharged from the stream of conveyor elements or even fully removed from the conveyor arrangement so as to be used e.g. in an equivalently configured conveyor arrangement of another container treatment system. By providing the conveyor elements with individual memory units including non-volatile storage media, it is thus possible to realize customized servicing of the individual conveyor elements in spite of a flexible adaptation of the number of conveyor elements used in the conveyor arrangement. Since non-volatile storage media are well known in the prior art, only a hard disk, an optical storage medium and a flash memory are exemplarily mentioned in the present connection.

In addition to the service life of the conveyor element, parameters that may be used as a state parameter of the conveyor element are also a counter for the number of circulations of the conveyor element in a closed part of the conveyor track, the number of containers conveyed by the conveyor element, a degree of wear of a bearing element of the conveyor element, e.g. the thickness of a plain bearing, an abrasive wear of the plain bearing, a distance between a housing of the conveyor element and a guide rail of the conveyor track or a value for the amount of play of the plain bearing as well as a flag indicating the freedom from defects of a functional element of the conveyor element. For conveyor elements which are supported in different ways or which include different functional elements, it is additionally imaginable to monitor and possibly store various individual state parameters through the open-loop and/or closed-loop control unit.

Depending on the at least one state parameter of the conveyor element, the open-loop and/or closed-loop control unit supplies the conveyor element to the servicing device for executing one or a plurality of servicing processes. To this end, the respective state parameter can, upstream of the servicing device, be determined by the open-loop and/or closed-loop control unit by means of an examination device or detected by means of a reading device or an identification detection device, so that, if necessary, the conveyor element can be supplied to the servicing device by the open-loop and/or closed-loop control unit. The conveyor arrangement according to the present disclosure can thus supply damaged or defective conveyor elements to the servicing device before such a conveyor element could block the process line. Trouble-free functioning of the conveyor arrangement without losing valuable production time can be guaranteed in this way by regular servicing based e.g. on the monitored service life of the conveyor elements or by remedial servicing.

According to a further development, the conveyor element and at least a part of the conveyor track may be configured such that, in the area of said part of the conveyor track, the conveyor element can be moved by means of a magnetic force, preferably in interaction with the conveyor track. According to the present disclosure, the conveyor track and the conveyor elements are configured such that each conveyor element can be guided along the conveyor track in an individually controllable manner, e.g. from a pick-up location to a delivery location. This means that the at least one conveyor element includes at least one reaction element which, by means of mechanical and/or electromagnetic interaction with interaction elements arranged along the conveyor track, has a force applied thereto by means of which the conveyor element can be accelerated and thus moved. By precisely controlling the reaction element of a specific conveyor element and/or one or a plurality of interactive elements in a limited area of the conveyor track, this application of force can be limited to a specific conveyor element, whereby the conveyor element can be guided along the conveyor track separately and independently of other conveyor elements. According to the further development described, the conveyor element can be moved by means of a magnetic force, preferably in interaction with the conveyor track. The individual control of the conveyor elements and the control of the reaction elements and/or of the interactive elements are executed by means of the open-loop and/or closed-loop control unit of the conveyor arrangement.

The respective part of the conveyor track may thus be provided with a magnetic linear drive, e.g. in the form of an asynchronous linear motor. To this end, the respective section of the conveyor track is provided with a plurality of electric coils in the form of individually controllable electromagnets. In order to create a magnetic interaction between a conveyor element and the individually controllable electromagnets of the conveyor track, the conveyor element may be provided with one or a plurality of permanent magnets or non-switching electromagnets or ferrite cores. According to one possible embodiment, the conveyor element is configured as a passive conveyor element that is moved through interaction with the alternating electromagnetic fields generated by the individually controllable electromagnets of the conveyor track. The at least one permanent magnet or non-switching electromagnet or ferrite core of the conveyor element thus defines the above mentioned reaction element, whereas the individually controllable electromagnets of the conveyor track define the above mentioned interactive elements. When passive conveyor elements are used, a localizing unit is preferably provided at the conveyor track, so as to determine the position of at least one conveyor element and preferably of all conveyor elements and report it to the open-loop and/or closed-loop control unit for controlling the electromagnets of the conveyor track. The strength of the current through the electric coils of the conveyor track can be adapted automatically by the open-loop and/or closed-loop control unit depending on a power demand of the conveyor element to be moved. By separately controlling the strength of the current through individual coils of the conveyor track by open-loop and/or closed-loop control, the conveyor element can be accelerated, decelerated or moved with a constant predetermined speed.

According to an alternative embodiment, the conveyor element, being an active conveyor element, comprises electric coils, which can apply the alternating magnetic fields required for the purpose of driving. Accordingly, the respective section of the conveyor track is provided with permanent magnets or non-switching electromagnets. The electric energy required for the purpose of driving as well as the signals required for the purpose of controlling can here be transmitted to the conveyor elements via transmission by induction. The control may thus be located off-center on the respective conveyor elements or it may be accommodated centrally in a separate control unit. Alternatively, the necessary electric energy may be transmitted to the conveyor elements via a line arranged along the conveyor track. Furthermore, a combination of conveyor elements configured as active conveyor elements with a conveyor track having individually controllable electromagnets is imaginable.

In addition to the above-described conveyor track part configured as a magnetic track, the conveyor track may also comprise at least one subsection along which the conveyor element can be moved with a constant speed. To this end, the subsection may comprise a drive unit in the form of a conveyor belt, a conveyor chain or the like. By combining subsections having a magnetic drive with subsections having a mechanical drive, the installation costs of the conveyor arrangement in its entirety can be reduced. In particular, such a subsection having a mechanical drive may at least constitute part of the connection between the servicing device and the conveyor track.

According to another further development, the conveyor element may be supported on the conveyor track in a fully magnetic manner, or in a partly magnetic and a partly mechanical manner, or in a fully mechanical manner. In the case of a fully magnetic support, the above-described part of the conveyor track is configured as a magnetic levitation system, wherein electric coils causing a magnetic levitation of the conveyor element above the conveyor track are provided in the conveyor track and/or the conveyor element. The friction between the conveyor element and the conveyor track can thus be reduced to a minimum. In the case of a partially magnetic and a partially mechanical support, the conveyor element may additionally be provided with one or a plurality of support elements, e.g. in the form of support rollers and/or guide rollers. Likewise, a partially or fully mechanical support by means of at least one plain bearing is imaginable. The additional support elements or plain bearings roll along or slide along a running surface of the conveyor track. In the case of a fully mechanical support, the conveyor element may be supported exclusively by the above-described at least one support element or plain bearing. Additionally or alternatively thereto, the support may also be of a pneumatic nature, the conveyor track being then configured as an air levitation system in the subsection in question. A pneumatic support provides, like a fully magnetic support, a reduction of the friction between the conveyor element and the conveyor track to a minimum. A guide and support system that is as economical as possible can be realized e.g. by means of a plain bearing.

According to a further development, the conveyor track of the conveyor arrangement according to the present disclosure may comprise a main line and a secondary line, the servicing device being arranged at the secondary line, and the secondary line being connected to the main line via at least one track switch for discharging the conveyor element from the main line and/or for introducing the conveyor element into the main line.

Generally, the at least one conveyor element belongs to a plurality of conveyor elements defining a stream, i.e. a continuous flow of conveyor elements in a direction predetermined by the open-loop and/or closed-loop control unit along at least part of the conveyor track. The plurality of conveyor elements may here comprise, in addition to the conveyor elements for conveying one or a plurality of containers, also conveyor elements having special functions. Such a stream of conveyor elements may e.g. connect a first container treatment unit, which executes a first process step at the conveyed containers, to a second container treatment unit, which executes a further, subsequent process step at the containers. Likewise, such a stream may connect one of the above described feed conveyors to a container treatment unit and/or a container treatment unit to one of the above described discharge conveyors. Finally, such a stream may, in turn, connect, via a feedback line as part of the above mentioned closed circuit, the discharge conveyor to the feed conveyor so as to close the circuit of conveyor elements. The above mentioned main line thus corresponds to a conveyor track part along which the stream of conveyor elements moves, e.g. between two container treatment units. The main line is consequently a part of the process line for treating the containers in the container treatment system. Depending on the layout of the container treatment system, a process line may, according to the present disclosure, also comprise more than one main line, especially when identical or equivalent container treatment units are arranged in parallel.

According to the present disclosure, the conveyor track comprises, in addition to the at least one main line, also a secondary line, which is not used for guiding the primary stream of conveyor elements as part of the process line. The process line is, here and in the following, the part of the container treatment system which serves to treat the containers and which comprises the feed conveyor, the discharge conveyor, container treatment units as well as the interconnecting parts of the conveyor arrangement. In particular, the process line comprises at least one feedback line for returning the plurality of conveyor elements from the at least one discharge conveyor to the at least one feed conveyor. Normally, individual conveyor elements are guided from the main line to a secondary line only for the purpose of carrying out individual method steps, e.g. servicing and/or examining the conveyor elements or the conveyed containers. According to the here described further development, the servicing device may be arranged at such a secondary line, the secondary line being connected to the main line via at least one track switch. Depending on the at least one state parameter of the conveyor element, the open-loop and/or closed-loop control unit can discharge a conveyor element to be serviced from the main line by switching the at least one track switch and supply said conveyor element to the servicing device via the secondary line. Likewise, the open-loop and/or closed-loop control unit can re-introduce the conveyor element, after it has been serviced by the servicing device, into the stream of conveyor elements along the main line via the same or a further track switch. The secondary line, at which the servicing device is arranged, may advantageously be connected to the main line after the fashion of a pit lane for the conveyor elements via a respective track switch for discharging and for re-introducing the conveyor elements. In a particularly advantageous manner, the main line may, as described above, comprise a feedback line. The secondary line, along which the servicing device is arranged, is in this case connected to the feedback line via the at least one track switch. Normally, the containers conveyed by the conveyor elements are unloaded from the latter before the conveyor elements are returned via the feedback line, so that the above described arrangement allows servicing of the conveyor elements in an unloaded state. The open-loop and/or closed-loop control unit of the conveyor arrangement may be configured for individually controlling by open-loop and/or closed-loop control the electric coils of the conveyor track and/or the conveyor elements as well as for controlling the position of the one or several track switches along the conveyor track. The control by open-loop and/or closed-loop control of the electromagnets of the conveyor track and/or of the conveyor elements as well as of the track switches may especially be effected depending on the at least one state parameter of the conveyor elements as well as the positions of the conveyor elements along the conveyor track.

According to a further development, the servicing device may comprise at least one device of the group consisting of a cleaning device, a sterilization device, a lubricating device, a repair device, a reconfiguring device, a replacement device for wearing parts and a replacement device for format parts. In a cleaning device, the conveyor element or parts thereof, such as the bearing surface of a plain bearing, can be cleaned, e.g. with a brush and/or pressurized air from an air nozzle. By means of an UV radiator or a heating device, the conveyor element or parts thereof can be sterilized in a sterilization device. In a lubrication device, a lubricant can effectively be applied to the bearing points and/or the running surfaces of the conveyor element, in particular after a preceding cleaning process. In a repair device, damaged parts of the conveyor element can be repaired, whereas in a reconfiguring device, parts of the conveyor element can be replaced by alternative components kept in stock in the servicing device. Finally, in a replacement device for wearing parts, wearing parts, such as plain bearings or support elements, and in a replacement device for format parts, format parts, such as gripping and holding devices, can be replaced by wearing parts or format parts kept in stock in the servicing device. Wearing parts and format parts can here be replaced either by identical or by alternative wearing parts and format parts, respectively.

It goes without saying that, according to the present disclosure, the servicing device may also comprise a combination of a plurality of devices of the above mentioned group. In particular, after cleaning and sterilization of the conveyor element by means of a cleaning device and a sterilization device, the running surfaces and/or bearing points of the conveyor element may be lubricated by means of the lubricating device. The servicing device may here also be configured for simultaneously servicing a plurality of conveyor elements. Moving the conveyor element and the respective functional element of the servicing device, e.g. a brush or an air nozzle, synchronously along a servicing line, analogously to the principle of a car wash with a belt conveyor, proves to be particularly effective. The open-loop and/or closed-loop control unit of the conveyor arrangement may, according to the present disclosure, be configured for carrying out the servicing steps to be executed as well as the duration and/or intensity of the latter depending on the at least one state parameter of the conveyor element to be serviced. In particular, the open-loop and/or closed-loop control unit may control the conveyance of the conveyor elements to be serviced through the servicing device as well as the functional elements of the servicing device. The servicing processes may here advantageously be executed semi-automatically or fully automatically. Individual supplementary servicing steps may, however, also be executed manually. In the case of manual servicing, the conveyor element may be removed from the guide of the secondary line, and e.g. wearing parts may be replaced, preferably without making use of a tool, in particular by means of clips.

According to a special further development, in the case of which the servicing steps are executed at least semi-automatically, the replacement device for wearing parts and/or the replacement device for format parts may comprise at least one assembly robot and a magazine for wearing parts and/or format parts, the assembly robot being configured for replacing a wearing part and/or a format part of the conveyor element automatically by a wearing part and/or a format part from the magazine. The assembly robot may here be controlled by an open-loop and/or closed-loop control unit of the conveyor arrangement or by a separate control unit. The magazine for wearing parts and/or format parts may have a modular structural design, so that the simplest possible exchange by coupling to and decoupling from the servicing device is imaginable. Just as the functional elements of the servicing device, which have already been mentioned hereinbefore, also the assembly robot may be moved together with the conveyor element to be serviced along the secondary line in the servicing device so as to increase the efficiency. Different format parts, e.g. different embodiments of the gripper element, may be made available in separate magazines on the one hand or they may be made available in common in one magazine by means of separate identification units such as bar codes. In this case, the assembly robot is provided with an identification detection device for reading the identification units of the format parts. Thus, the conveyor element can be reconfigured in the servicing device by replacing a format part by an alternatively configured format part by means of the assembly robot. In order to save costs, it may be of advantage to replace, in the case of a change of product, not the entire conveyor element but only product-specific format parts, like the gripper element, in the servicing device.

Alternatively or additionally, the servicing device may comprise a magazine for conveyor elements, which is, in particular, adapted to be coupled as a unit to the servicing device. In particular, the magazine may be placed on wheels and coupled to or decoupled from the servicing device, if necessary. Conveyance within the magazine may here take place by means of the above described magnetic interaction or by means of a conventional drive known in the prior art. The initially mentioned at least one state parameter of the conveyor element can thus also be used for marking a conveyor element for reconfiguring, e.g. in the case of a change of product. According to the here described further development not only a format part of the conveyor element, but the entire conveyor element is, in this case, replaced by a conveyor element from the magazine, said conveyor element being configured for the new product. The permanently discharged former conveyor element may here remain in the magazine and be decoupled, together with said magazine, from the servicing device later on.

According to a further development, the servicing device may be connected to the conveyor track according to the First In-First Out, FIFO, principle. This can especially be realized by providing a separate track switch for discharging the conveyor elements from the main line or for re-introducing them into the main line. A conveyor element discharged by means of the open-loop and/or closed-loop control unit thus enters the servicing device via the first track switch and is re-introduced into the stream of conveyor elements via the second track switch, according to the FIFO principle.

By providing a servicing device for conveyor elements, in particular at a secondary line of the conveyor arrangement, a reliable operation of the conveyor arrangement and thus of the entire container treatment system can be guaranteed, without major operating efforts being necessary. In addition, a very fast change of product or change of format of the containers is made possible, in particular by means of a reconfiguring or replacement device of the servicing device.

The present disclosure also provides a conveyor arrangement for conveying containers in a container treatment system, including:
 a conveyor track,
 at least one conveyor element movably arranged on the conveyor track and used for conveying one or a plurality of containers,
 an open-loop and/or closed-loop control unit, and
 an examination device,
 where the conveyor track and the conveyor element are configured such that the conveyor element can be guided along the conveyor track in an individually controllable manner by means of the open-loop and/or closed-loop control unit, and
 where the examination device is configured for determining at least one state parameter of the conveyor element.

The same variations and further developments which have been described above in connection with the conveyor arrangement comprising a servicing device can also be applied to the conveyor arrangement comprising the examination device. In particular, the conveyor arrangement may, in addition to the examination device, comprise the above described conveyor element servicing device connected to the conveyor track. Furthermore, the at least one state parameter of the conveyor element determined by the examination device may correspond to the state parameter of the conveyor element in dependence upon which the open-loop and/or closed-loop control unit supplies the conveyor element to the servicing device.

Depending on the state parameter to be determined, the examination device may comprise e.g. a reading or identification detection device for reading or detecting an identification unit of the conveyor element, a measurement device for examining wearing parts of the conveyor element and/or a test station for testing functional elements, e.g. the gripper element, of the conveyor element. In the first case, the examination device may determine e.g. a service life of the conveyor element by reading a time or time mark stored in a memory unit of the identification unit of the conveyor element, said time or time mark corresponding to the entire running time of the conveyor element since the last servicing or since the date on which the conveyor element was installed in the conveyor arrangement or to the last servicing date or the date on which the conveyor element was installed in the conveyor arrangement. Likewise, the examination device is able to determine, by reading from a memory unit an identification unit of the conveyor element, the number of circulations of the conveyor element in the circuit of the conveyor arrangement since the last servicing or since the date on which the conveyor element was installed in the conveyor arrangement. A large number of other state parameters that can be determined by the examination device are imaginable, in particular state parameters characterizing the type of conveyor element as being e.g. suitable for a special type of container or a special product. For identifying specific format parts of the conveyor element, the examination device may comprise e.g. a reading device for distinct bar codes identifying the special format parts.

The examination device may be arranged along one of the above described main lines of the conveyor track or also along a secondary line specially provided for the examination of conveyor elements. In particular, the examination device may be configured as part of the main line or of the secondary line. When the examination device is arranged along a secondary line, said examination device may especially be disposed upstream of a servicing device that is provided as well. Depending on a result of the examination through the examination device, the open-loop and/or closed-loop control unit will here supply examined conveyor elements to the servicing device for the purpose of servicing, or feed said conveyor elements back into the main line past the servicing device. The discharge of conveyor elements from the main line, e.g. via a controlled track switch or a controlled removal mechanism, can here be controlled by means of the open-loop and/or closed-loop control unit. In particular, the open-loop and/or closed-loop control unit may be configured such that individual conveyor elements are discharged from the stream of conveyor elements, according to a predetermined random principle, for examination by the examination device. Alternatively or additionally, the open-loop and/or closed-loop control unit of the conveyor arrangement can discharge conveyor elements, which attracted attention in a predetermined manner, e.g. by errors during transfer to the feed conveyor or the discharge conveyor or during treatment of the conveying containers in a container treatment system, from the stream of conveyor elements and supply them to the examination device for detailed examination. This allows occasionally occurring defective conveyor elements to be detected early enough, or possibly occurring malfunctions of the conveyor elements to be examined in more detail and to be eliminated, if necessary, by means of a suitable servicing device. The arrangement of the examination device along the main line or as part of the main line is referred to as inline arrangement. An inline arrangement allows, depending on the demands specified by the operating staff, each conveyor element or each $n^{th}$ conveyor element, with an integer n larger than 1, that moves past the examination device to be examined with respect to the at least one state parameter.

According to a further development, the conveyor element may be supported on the conveyor track in an at least partially mechanical manner, wherein the at least one state parameter comprises a degree of wear of a bearing element of the conveyor element, wherein the examination device comprises a part of the conveyor track, which includes a plurality of interaction elements and a plurality of sensors, in particular magnetic field sensors, arranged along the conveyor track and used for determining a position of the conveyor element along the conveyor track, and a measurement device, and wherein the measurement device is configured for determining, by means of the interaction elements and/or sensors, a coefficient of friction for a movement of the conveyor element along the conveyor track.

As has been described hereinbefore, the at least partially mechanical support of the conveyor element on the conveyor track may be realized by means of mechanical bearing elements, such as support elements, support rollers and/or plain bearings. Due to the at least partially mechanical support, such a bearing element is subjected to wear, caused especially by abrasion, roughening and/or corrosion, which increases as time goes by and which can be quantified by a suitably selected degree of wear. The degree of wear of the bearing element directly affects the coefficient of friction of the bearing element when the conveyor element moves along the conveyor track. Increasing wear of the bearing element will generally result in an increase in the coefficient of friction and consequently in a higher expenditure of energy for moving the conveyor element along the conveyor track with a predetermined speed.

In order to counteract an unnecessary power consumption caused by a coefficient of friction that has increased due to wear, the examination device according to the present further development may comprise a part of the conveyor track and a measurement device, said part of the conveyor track including a plurality of interaction elements and a plurality of sensors, in particular magnetic field sensors, arranged along the conveyor track and used for determining a position of the conveyor element along the conveyor track. The interaction elements may here especially be given by the above described interaction elements for moving the conveyor element by means of a magnetic force. The interaction elements of the conveyor track, which may especially be configured as electric coils, generally have automatically applied thereto an electric current by means of the open-loop and/or closed-loop control unit, said electric current being suitable for moving the conveyor element along the conveyor track with a desired speed and acceleration. Insufficient current strength or increased friction will here result in a so-called contouring error of the linear motor defined by the interaction elements of the conveyor track. This contouring error can be determined especially by the plurality of sensors arranged along the conveyor track and used for determining a position of the conveyor element.

In particular, the position of a conveyor element on the part of the conveyor track may be determined by a regular and periodic arrangement of sensors along this part of the conveyor track. The sensor may here be configured as an optical sensor, an electrical sensor, an electromagnetic sensor or a mechanical sensor, the position of the conveyor element in the area of the respective sensor being determinable e.g. by measuring a light reflection at a reflector element of the conveyor element, by induction of an electromagnetic signal due to the movement of the conveyor element, by a change in the electric resistance of the sensor utilizing a magnetoresistive effect, e.g. due to the magnetic flux of a magnetic reference element, in particular a permanent magnet, or of the reaction element of the conveyor element, or by local pressure measurements on the basis of the weight of the conveyor element. An electromagnetic sensor may here be configured as a Hall sensor providing a signal even if the magnetic field, in which it is located, is constant. Likewise, when the electromagnetic sensor is configured as a magnetic field sensor, a change in the electric resistance is caused on the basis of magnetoresistive effects, such as the anisotropic magnetoresistive effect (AMR effect), the "giant" magnetoresistive effect (GMR effect) as well as additional magnetoresistive effects, such as the CMR effect and the TMR effect, said change in electric resistance being dependent on the magnetic field to be measured. It follows that Hall sensors as well as magnetoresistive sensors allow the determination of the position of a conveyor element along the conveyor track also without inductive effects, i.e. also in the event that the conveyor element stands still. In this case, the respective sensor detects a local change of the background magnetic field through the reaction element of the conveyor element, in particular through a permanent or electromagnet attached thereto. Alternatively or additionally, the at least one conveyor element may be provided with a signaling unit generating a position signal. The position signal can be localized by suitable detectors in the area of the conveyor arrangement, so as to determine the position of the conveyor element along the conveyor track. This signaling unit of the conveyor element may especially be configured as an RFID chip.

According to the present further development, the measurement device of the examination device may be configured for determining, by means of the interaction elements and/or sensors, a coefficient of friction for a movement of the conveyor element along the conveyor track. This can be done, on the one hand, by controlling the current in the coils of the interaction elements such that the conveyor element will move along the conveyor track with a predetermined speed, and by comparing, by means of the examination device, the current strength required for this purpose with a target current strength depending on the weight of the conveyor element and the bearing of the same. If this necessary current strength exceeds a predetermined threshold value, the bearing is worn to a certain degree, which is thus detected by the examination device as a state parameter of the conveyor element. Alternatively, the examination device may allow the conveyor element to move freely along the part of the conveyor track and may determine the coefficient of friction of the bearing element from the deceleration behavior of the conveyor element or from the final position of the conveyor element after standstill. Also in this case a comparison between the determined coefficient of friction and a threshold value can be carried out by the examination device. If the threshold value is succeeded, the examination device can transmit a corresponding signal to the open-loop and/or closed-loop control unit of the conveyor arrangement, which, in response thereto, will supply the conveyor element in question to the servicing device for the purpose of servicing. In the servicing device, lubrication of the bearing or a replacement of the bearing element can be executed, e.g. by means of a lubricating device or a replacement device for wearing parts.

According to another further development, the conveyor element may, at least partially, be supported on a guide rail of the conveyor track by means of at least one plain bearing, wherein the at least one state parameter comprises a thickness of the plain bearing, an abrasive wear of the plain bearing, a distance between a housing of the conveyor element and the guide rail and/or a value for the amount of play of the plain bearing, and wherein the examination device comprises a part of the conveyor track, which includes at least one sensor for measuring the state parameter, in particular by means of a mechanical, capacitive, inductive and/or optical distance measurement.

Supporting the conveyor element by means of a plain bearing on a conveyor track guide rail, which has already been mentioned hereinbefore, is particularly economy-priced but normally also particularly liable to wear. When plain bearings are used, not only the coefficients of friction alone but also the wear of the plain bearing are of informative value as regards the state of the bearing. Said wear can be determined in different ways by the examination device according to the present further development. For example, a sensor may be installed at a predetermined point of the conveyor track part belonging to the examination device, said sensor measuring a distance between a housing of the conveyor element and the guide rail so as to determine therefrom e.g. the thickness of the plain bearing and a wear of the plain bearing, respectively. Such a distance measurement can be carried out by means of mechanical, capacitive, inductive and/or optical methods known in the prior art. In the case of a mechanical distance measurement, e.g. a push-button provided on the conveyor track or on the conveyor element may be operated, when the distance becomes smaller than a threshold value. An optical distance measurement can be executed e.g. by laser triangulation or laser interferometry. Likewise, the distance may be ascertained capacitively or inductively, e.g. by means of an eddy current sensor. The use of an eddy current sensor in combination with an electromagnetic linear drive through the above described, periodically arranged electric coils along the conveyor track is particularly advantageous, since, due to the relative movement of the conveyor element along the conveyor track, eddy currents, which counteract the movement of the conveyor element, are generated in electrically conductive components of the conveyor element. Hence, a contouring error of the conveyor element or a fault current in the interaction elements of the conveyor track can easily be used for determining therefrom the distance between the housing of the conveyor element and the guide rail.

Alternatively, the thickness of the plain bearing may also be measured directly by means of a distance measurement sensor arranged at a specific point of the part of the conveyor track. Likewise, it is imaginable to use an optical system with image processing through a processing unit of the examination device or of the open-loop and/or closed-loop control unit, which determines the distance of the housing and the thickness of the plain bearing, respectively, from a photo of the conveyor element, in particular of the plain bearing thereof, moving past the examination device. Likewise, a two- or multi-colored plain bearing may be used, in the case of which a different color comes out, when a specific degree of wear has been reached, said different color being detectable by means of the optical system.

By comparing the thus determined wear, distance or thickness of the plain bearing with a predetermined threshold value by the open-loop and/or closed-loop control unit, the conveyor element can, if necessary, be supplied to a servicing device for replacement of the plain bearing. It follows that, by regularly monitoring the wear of the plain bearing of the passing conveyor elements by means of the examination device and by subsequently servicing in the servicing device the conveyor elements to be serviced, an undesired increase in the coefficient of friction and the resultant unnecessary power consumption of the conveyor arrangement can be avoided.

According to a further development, the conveyor element may, at least partially, be supported on a guide rail of the conveyor track by means of at least one roller bearing, wherein the at least one state parameter comprises a rotational speed of the roller bearing, a loudness level of a rolling noise of the roller bearing and/or a value for a heat emission of the roller bearing, and wherein the examination device comprises a part of the conveyor track, which includes at least one sensor for measuring the state parameter, in particular an optical camera, a piezoelectric sensor, a thermographic camera and/or a pyrometer.

Supporting the conveyor element by means of a roller bearing on a guide rail that has already been mentioned hereinbefore, i.e. by means of rollers rolling on the guide rail and/or a running surface, is less liable to wear than a support by means of a plain bearing. However, wear of the roller bearing may have the effect that the roller bearing is no longer in correct rolling contact or may even block. In this case, the rotational speed of the roller bearing is reduced in comparison with that of a non-worn roller bearing. By comparing a measured rotational speed of the roller bearing with a target rotational speed, which depends on the speed of the conveyor element, wear of the roller bearing can be detected. Hence, the state parameter may comprise especially a value for the rotational speed of the roller bearing.

The rotational speed of the roller bearing may be determined e.g. by means of an optical camera by taking a large number of pictures in quick temporal succession. A processing unit of the examination device then determines from the recorded pictures the respective angular position of the roller bearing and calculates the rotational speed from the angular positions determined. For facilitating the determination of the angular position, the roller bearing may have provided thereon optical marks. By comparing the actual rotational speed with the target rotational speed, it can then be determined whether the roller bearing is in correct rolling contact or whether it blocks.

In addition, wear of the roller bearing may also be effected by a sensorial state examination of the roller bearing, e.g. by means of a piezoelectric sensor detecting vibrations or a rolling noise of a roller bearing passing by and subjecting said vibrations or said rolling noise to an actual/target comparison.

Likewise, contact-free monitoring of a temperature of the roller bearing can be carried out by means of a thermographic camera or a pyrometer, the temperature ascertained being subjected to an actual/target comparison. It goes without saying that two or more of the above mentioned measurement methods may be combined.

According to another further development, the examination device may comprise a test station configured for testing a functional element of the conveyor element, in particular a holding device for containers. The production of the container treatment system may be disturbed not only by wear of the bearing elements but also by a malfunction of functional elements of the conveyor element, e.g. a holding device for containers, such as a gripper element or a clamp, or of functional elements of conveyor elements having special functions, e.g. for cleaning the conveyor track or a container treatment unit, for conveying handling parts for a container treatment system, or the like. By means of a suitable test station of the examination device, the operability of the respective functional element or functional elements of the conveyor element can be tested at regular intervals, so that defective functional elements can be supplied to the servicing device by the open-loop and/or closed-loop control unit of the conveyor arrangement for replacement of the functional or format part in question. An early recognition of defective functional elements will reduce the number of failures and thus lead to an increase in the availability of the container treatment system.

According to a further development, the conveyor arrangement may additionally comprise an energy-buffered open-loop and/or closed-loop control circuit and a plurality of sensors arranged along the conveyor track and used for determining a position of the at least one conveyor element along the conveyor track as part of the energy-buffered open-loop and/or closed-loop control circuit, the energy-buffered open-loop and/or closed-loop control circuit being configured such that it is capable of determining the position of the at least one conveyor element in the switched-off condition of the container treatment system.

According to the present disclosure, the energy-buffered open-loop and/or closed-loop control circuit comprises a plurality of sensors arranged along the conveyor track and adapted to be used for determining the positions of the conveyor elements along the conveyor track. To this end, the energy-buffered open-loop and/or closed-loop control circuit may be configured separately of the interaction elements of the conveyor track as well as separately of an open-loop and/or closed-loop control unit of the conveyor arrangement used for controlling the interaction elements. By reducing the control elements to be buffered to those elements which are used for determining and further processing the position of the conveyor elements along the conveyor track, an efficient and correct determination of the positions of the conveyor elements can be guaranteed even in the switched-off condition of the container treatment system, i.e. in a condition in which the power supply of the container treatment system is interrupted. As described above, the positions determined may here be stored in a memory unit, together with the state parameters of the conveyor elements, and read when the conveyor arrangement is restarted (see below).

According to another further development, the open-loop and/or closed-loop control circuit may additionally comprise a memory unit for storing a specific position. As described above, the memory unit may be configured as a non-volatile storage medium, e.g. in the form of a hard disk, a flash drive, a memory card, an optical storage medium, or some other non-volatile storage medium known in the prior art. As will be described in the following, the energy-buffered open-loop and/or closed-loop control circuit can here reliably determine the positions of the conveyor elements after decrease of a residual movement after deactivation of the container treatment system, e.g. through power failure, and store them in the memory unit for future use, e.g. in an initialization phase of the conveyor arrangement.

According to another further development, the open-loop and/or closed-loop control circuit may be energy-buffered by an uninterruptible power supply. The uninterruptible power supply may be configured for guaranteeing a power supply of the open-loop and/or closed-loop control circuit for a predetermined minimum period starting when the container treatment system is switched off. Uninterruptible power supplies (UPS) are known in the prior art and can be realized e.g. by means of a rechargeable battery, a battery or a capacitor. The energy-buffered open-loop and/or closed-loop control circuit may additionally be configured as a memory-programmable control unit.

In the case of another further development, the sensors may be magnetic field sensors. The magnetic field sensors may in particular be Hall sensors or sensors for measuring the magnetic flux on the basis of one of the above described effects.

The present disclosure also provides a method for recording, in the switched-off condition of the container treatment system, the positions of individually controllable conveyor elements of a conveyor arrangement for conveying containers in a container treatment system along a conveyor track, wherein the conveyor elements are arranged so as to be movable on the conveyor track, the method including the following steps:

buffering a power supply of an open-loop and/or closed-loop control circuit for a predetermined minimum period from the moment at which the container treatment system is switched off, and determining a first position of a conveyor element along the conveyor track at a first moment in time by means of the energy-buffered open-loop and/or closed-loop control circuit.

In this context, the same variations and further developments, which have been described hereinbefore in connection with the individually controllable conveyor elements, the conveyor track and the container treatment system, may also be applied to the method for recording the positions. In particular, the open-loop and/or closed-loop control circuit may comprise one or a plurality of the above described open-loop and/or closed-loop control units.

During normal operation of a conveyor arrangement for conveying containers in a container treatment system by means of individually controllable conveyor elements, an open-loop and/or closed-loop control circuit controls the conveyor elements individually along the conveyor track. During the normal operation of the conveyor arrangement, the positions of the individually controllable conveyor elements are generally known to the open-loop and/or closed-loop control circuit insofar as they are available, e.g. as time-dependent data, in a memory unit or an open-loop and/or closed-loop control unit of the open-loop and/or closed-loop control circuit. However, when a control voltage for individually controlling the conveyor elements is switched off, the conveyor elements lose their absolute position, i.e. their position can no longer be monitored and stored by the open-loop and/or closed-loop control circuit, so that it is not possible to keep track of the conveyor elements. In view of the inertial mass of the conveyor elements, they will normally continue to move also after the control voltage has been switched off, so that the information on the final positions of the conveyor elements gets lost even if the positions of the conveyor elements are stored in a non-volatile memory of a memory unit before the control voltage is switched off. Product tracking is therefore not possible. In addition, the initialization routine executed when the container treatment system is restarted is highly error-prone, since it may perhaps be impossible to recognize certain conveyor elements.

Such switching off of the control voltage may occur e.g. during shut-down of the container treatment system or of the conveyor arrangement and, in particular, during a power failure. The method according to the present disclosure now provides buffering of a power supply of the open-loop and/or closed-loop control circuit for a predetermined minimum period starting at the moment in time at which the container treatment system is switched off. The buffered open-loop and/or closed-loop control circuit may be configured as an independent part of the open-loop and/or closed-loop control circuit in its entirety, which independent part may e.g. comprise only the localization units or sensors of the conveyor track and a central open-loop and/or closed-loop control unit with a memory unit for storing the positions and, optionally, the state parameters of the conveyor elements as well as possibly the control electronics for controlling the interaction elements of the conveyor track. The power required for buffering the power supply of the open-loop and/or closed-loop control circuit is therefore much less than that required for operating the entire conveyor arrangement, including e.g. also the power supply of the interaction elements of the conveyor track. The buffering of the power supply of the open-loop and/or closed-loop control circuit can therefore be realized via a suitably dimensioned emergency power supply, i.e. an uninterruptible power supply, e.g. in the form of a rechargeable battery, a battery or a capacitor, the emergency power supply being configured for guaranteeing a power supply of the open-loop and/or closed-loop control circuit for the predetermined minimum period of time.

The uninterruptible power supply may here be configured such that it will be switched on independently and automatically, if the power supply of the conveyor arrangement should fail. In this case, the emergency power supply supplies power to the open-loop and/or closed-loop control circuit for the predetermined minimum period starting at the moment in time at which the container treatment system is switched off. In this respect, it is assumed that switching off of the container treatment system comprises an interruption of the power supply of the conveyor arrangement. Alternatively, the buffering of the power supply through the emergency power supply may, however, also start with a certain delay of time. The delay may here be chosen such that the conveyor elements come to a complete standstill within the delay of time.

With the aid of the buffered open-loop and/or closed-loop control circuit, a first position of a conveyor element along the conveyor track is now determined at a first moment in time according to the present disclosure. In so doing, the first moment in time can be chosen such that a residual movement of the conveyor elements during switching off of the container treatment system will have substantially decreased, e.g. by 95%, before said first moment in time. A typical delay of the first moment in time after the moment in time at which the container treatment system is switched off may e.g. be 0.5 to 10 seconds. The determination of the first position by means of the energy-buffered open-loop and/or closed-loop control circuit is here executed automatically.

According to a further development, the determination of the first position may be executed making use of a plurality of sensors, in particular magnetic field sensors, arranged along the conveyor track and constituting part of the energy-buffered open-loop and/or closed-loop control circuit. The sensors, in particular in the magnetic field sensors, may here be configured as described above. According to a special further development, an open-loop and/or closed-loop control unit of the energy-buffered open-loop and/or closed-loop control circuit may successively retrieve information from the plurality of sensors arranged along the conveyor track, so as to determine a first position for each conveyor element arranged along the conveyor track.

According to another further development, the method may additionally include the following steps:

determining a second position of the conveyor element along the conveyor track at a second moment in time, later than the first moment in time, by means of the energy-buffered open-loop and/or closed-loop control circuit, comparing the second position with the first one and storing the second position in a memory unit of the open-loop and/or closed-loop control circuit, if the second position deviates from the first position by less than a predetermined distance.

The second position of the conveyor element may, as has already been the case with the first position, be determined automatically on the basis of the plurality of sensors arranged along the conveyor track. The second moment in time may be delayed by a predetermined period in comparison with the first moment in time. This period may be chosen such that a residual movement of the conveyor element, caused e.g. by the inertia of the conveyor element, will have decreased at the second moment in time with high probability, e.g. with a probability of 95%.

If the second position deviates from the first position by a distance that is smaller than a predetermined distance, the second position will be stored in a memory unit of the open-loop and/or closed-loop control circuit in accordance with the present disclosure. The predetermined distance may here especially be smaller than the distance between neighboring interaction elements of the conveyor track. The memory unit, in which the second position is stored, may especially be configured in the form of a non-volatile storage medium, e.g. a hard disk, an optical storage medium, a flash memory or similar non-volatile storage media known in the prior art.

If the second position should deviate from the first position by the predetermined distance or by more than the predetermined distance, a further position of the conveyor element along the conveyor track may be determined at a further moment in time, later than the second moment in time, by means of the energy-buffered open-loop and/or closed-loop control circuit, and the above described step of comparing and storing may be repeated. It goes without saying that the method steps described may be applied repeatedly. In this respect, it is especially possible to repeat the steps at predetermined fixed time intervals. The number of possible repetitions results here from the predetermined minimum time and the predetermined time interval.

Hence, the method according to the present disclosure allows to record, even if the power supply of the conveyor arrangement should fail all of a sudden, the final positions of the conveyor elements along the conveyor track in a non-volatile storage medium through the energy-buffered open-loop and/or closed-loop control circuit. Continuous product tracking is thus possible. When the container treatment system is being restarted, the thus stored positions of the conveyor elements can be read from the memory unit of the open-loop and/or closed-loop control circuit, for use by an open-loop and/or closed-loop control unit for the purpose of initializing the conveyor arrangement. It follows that an initialization of the conveyor arrangement after a failure of the power supply will be much easier and can be accomplished much faster. In particular, products that were still being conveyed when the power supply failed can be taken into account during the initialization, so that rejects and unnecessary downtimes can be avoided.

The above-mentioned aspect is also achieved by a method for servicing a plurality of individually controllable conveyor elements for conveying containers in a container treatment system along a conveyor track, wherein the plurality of conveyor elements is arranged so as to be movable on the conveyor track, the method including the following steps:

determining at least one state parameter of a conveyor element among the plurality of conveyor elements, comparing the determined at least one state parameter with a predetermined target state of the conveyor element, supplying the conveyor element to a servicing device, which is arranged at the conveyor track, by moving the conveyor element along the conveyor track in the event that the determined at least one state parameter deviates from the predetermined target state, the movement being controlled by means of an open-loop and/or closed-loop control unit, and executing at least one servicing process at the conveyor element by the servicing device.

The same variations and further developments which have been described above in connection with the conveyor arrangement according to the present disclosure may here also be applied to the servicing method. In particular, the at least one state parameter of the conveyor element may comprise the above described state parameters and may be determined by means of one of the above-described examination devices. The determination of the at least one state parameter may be carried out whenever the respective conveyor element moves past the examination device or may be triggered by the open-loop and/or closed-loop control unit of the conveyor arrangement at regular or predetermined time intervals. The determined at least one state parameter can then be compared with a predetermined target state of the conveyor element through the open-loop and/or closed-loop control unit, in particular through a processing unit of the open-loop and/or closed-loop control unit. If the at least one state parameter deviates from the predetermined target state by at least a predetermined difference, the open-loop and/or closed-loop control unit can guide the conveyor element to a servicing device arranged at the conveyor track for the purpose of servicing. Depending on the result of the comparison, a suitable servicing process can then be carried out at the conveyor element in the servicing device, controlled by the open-loop and/or closed-loop control unit. As described above, the conveyor element may in particular be cleaned, sterilized, it may have applied thereto a lubricant, may be repaired or reconfigured and/or wearing parts and/or format parts of the conveyor element may be replaced in the servicing device.

According to another further development, the determination of the at least one state parameter of the conveyor element may comprise examination of the wear of a bearing element of the conveyor element and/or a function test of a functional element, in particular of a container holding device, of the conveyor element, the at least one state parameter being automatically determined by an examination device, preferably at regular time intervals. The time intervals may here be predetermined by the operating staff or determined in dependence upon the bearing element used, the functional element used and/or the containers to be conveyed. A wear examination and a function test may here be executed in the way described hereinbefore. The above described method steps may be executed in particular automatically, e.g. by means of the open-loop and/or closed-loop control unit of the conveyor arrangement. The method may be executed automatically, without intervention of the operating staff, by the open-loop and/or closed-loop control unit at predetermined moments in time, at predetermined time intervals and/or depending on predetermined process parameters, such as the service life of a container treatment system, a change of product in the system, faulty processing of containers in a container treatment unit or faulty behavior of conveyor elements, etc., or it may be executed in response to a demand on the part of the operating staff.

BRIEF DESCRIPTION OF THE DRAWINGS

Additional features and exemplary embodiments as well as advantages of the present disclosure will be explained hereinafter in more detail in making reference to the drawings. It goes without saying that the embodiments do not exhaust the scope of the present disclosure. It also goes without saying that some or all of the features described hereinafter may also be combined with one another in other ways.

DETAILED DESCRIPTION

Figure 1:
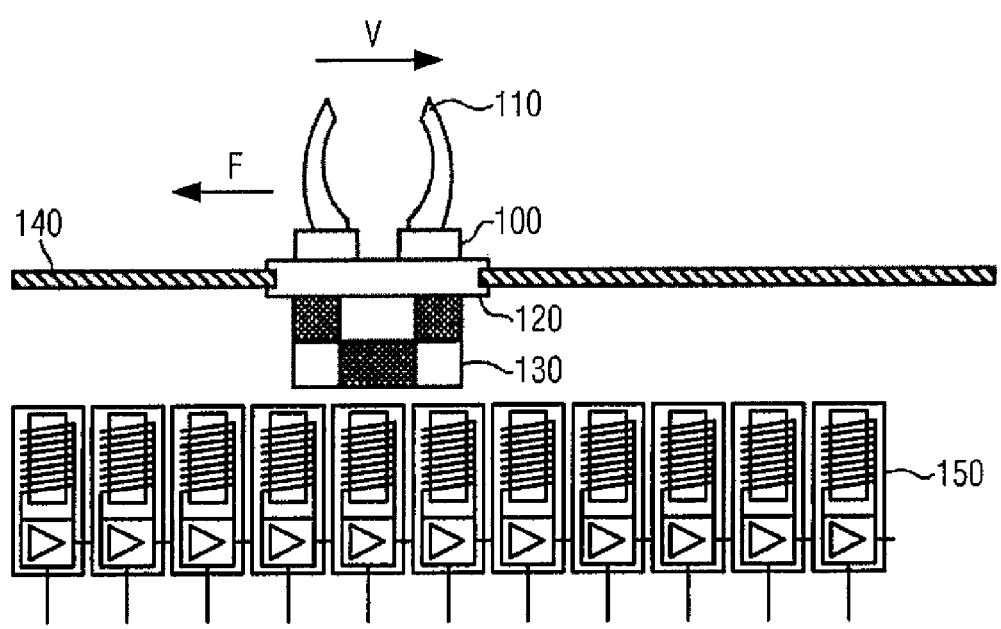
FIG. 1 shows an exemplary embodiment of the at least one conveyor element and of the interaction elements of the conveyor track.

FIG. 1 exemplarily shows a conveyor element 100. The present disclosure is, however, not limited to the here shown special embodiment of the conveyor element, but is applicable to any kind of conveyor elements as long as they can be guided along a conveyor track in an individually controllable manner, especially when this is done by means of magnetic interaction with the conveyor track. The here shown conveyor element 100 can be guided along the conveyor track by means of a guide rail 140. According to this special embodiment, the conveyor element is supported on the guide rail 140 by a plain bearing 120. The figure additionally shows a gripper element 110 by means of which the conveyor element is able to pick up the containers.

The here shown passive conveyor element is driven by magnetic interaction between the reaction element 130 of the conveyor element and a large number of electric coils 150 along the conveyor track. The electric coils 150 can be controlled individually and, being electromagnets, they can be reversed in polarity separately. Due to the interaction between the magnetic fields of the electromagnets and the here shown permanent magnet of the conveyor element, the conveyor element is subjected to an action of force, which, when the electromagnets 150 are suitably controlled, leads to an acceleration, deceleration or a constant movement of the conveyor element along the guide rail 140. The here shown reaction element 130 of the conveyor element consists of three permanent magnets arranged alternately and perpendicular to the guide rail, the width of the central permanent magnet corresponding approximately to the distance between two neighboring electric coils of the conveyor track and the width of each of the outer permanent magnets corresponding approximately to half the distance between said neighboring electric coils. Therefore, an alternating polarity of neighboring electromagnets on the conveyor track allows application of a maximum force to the reaction element along the guide rail. By individually controlling the electromagnets 150, the conveyor element 100 can be moved along the guide rail 140 with a speed V predetermined by an open-loop and/or closed-loop control unit of the conveyor arrangement. Due to the friction occurring between the here shown plain bearing 120 and the guide rail 140, each conveyor element is counteracted by a specific force F, which is directly related to the quality of the support (coefficient of friction). The current strength required in the electric coil 150 for overcoming this friction force F can therefore be used for determining the coefficient of friction and thus the quality of the support by means of an examination device arranged along the conveyor track. It goes without saying that the magnets of the conveyor element, which are shown in the figure and arranged perpendicular to the guide rail, may also be electromagnets.

Figure 2:
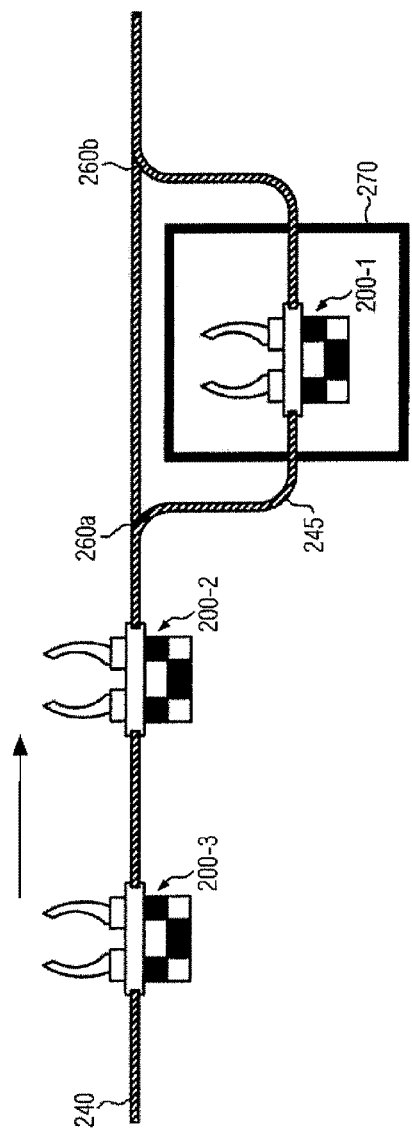
FIG. 2 shows a schematic diagram for the arrangement of a servicing device at a secondary line according to the present disclosure.

FIG. 2 shows a schematic diagram of the arrangement of a servicing device at a secondary line according to the present disclosure. As described above, the exemplarily shown servicing device 270 may comprise a plurality of devices for cleaning, sterilizing, lubricating, repairing or reconfiguring the conveyor elements 200-1 to 200-3. Other than shown here, the servicing device 270 may also service more than one conveyor element at a time. In the special embodiment shown, the stream of conveyor elements 200-2 and 200-3 moves along a main line 240 of the conveyor track. The main line may in particular be part of a feedback line of the conveyor arrangement. Advantageously, the conveyor elements 200-1 to 200-3 are thus not loaded with containers in the area of the servicing device.

According to the here shown special embodiment, the servicing device 270 is arranged at a secondary line 245 of the main line 240. Depending on at least one state parameter of the conveyor elements, individual conveyor elements 200-1 are supplied, controlled by an open-loop and/or closed-loop control unit of the conveyor arrangement, to the servicing device via a first track switch 260a. In the embodiment shown here, the conveyor elements are guided along the secondary line preferably through the same interaction with which the conveyor elements are also guided along the main line. After execution of one or more servicing processes at the conveyor element 200-1, the latter is reintroduced in the stream of conveyor elements along the main line 240 via a second track switch 260b. The here shown secondary line is thus operated according to the First In-First Out, FIFO, principle.

Figure 3:
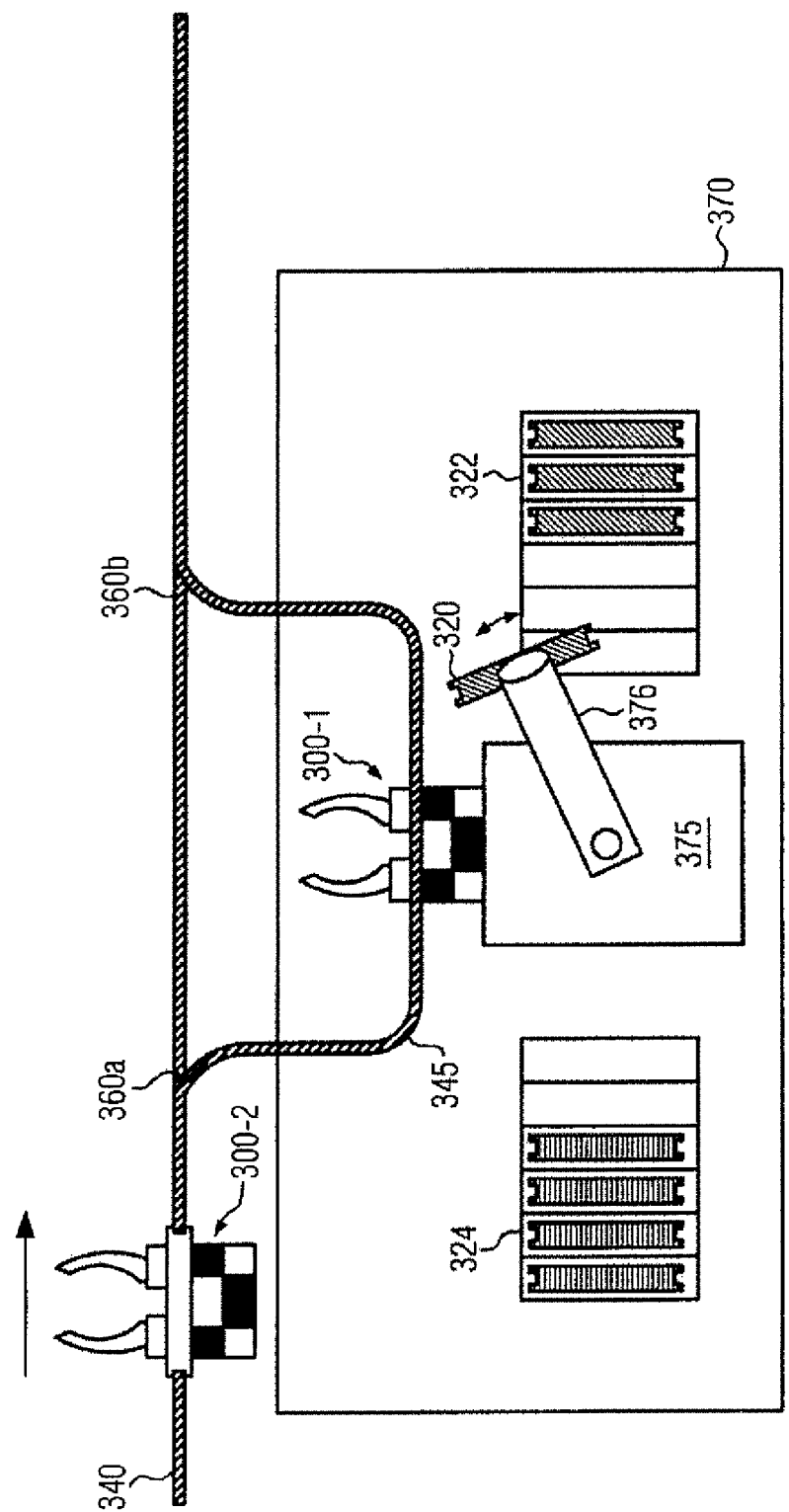
FIG. 3 shows a schematic diagram for a replacement device for wearing parts with an assembly robot according to the present disclosure.

FIG. 3 shows schematically a special embodiment of the parallel arranged servicing device with a replacement device for wearing parts. Like in FIG. 2, the stream of conveyor elements 300-2 moves along the main line 340, from which conveyor elements 300-1 can be supplied, if necessary, and especially in the case of wear of the plain bearing shown here, via a first track switch 360a to the servicing device 370 arranged at a secondary line 345. In the special embodiment shown here, the servicing device 370 comprises a replacement device for wearing parts, in particular for the plain bearings shown here. An assembly robot 375 removes a worn plain bearing of the conveyor element 300-1 to be serviced and deposits it in a magazine 324 for worn plain bearings. Subsequently, the assembly robot 375 takes, by means of a rotatably supported assembly arm 376, a new plain bearing 320 from a magazine 322 for new plain bearings and installs it automatically in the conveyor element 300-1 to be serviced. The magazines 322 and 324 may here be configured as modular units, which, if necessary, can automatically or manually be coupled to or decoupled from the servicing device by the operating staff. When the plain bearing has been exchanged, the conveyor element 300-1 is automatically re-introduced by the open-loop and/or closed-loop control unit into the stream of conveyor elements along the main line 340 via a second track switch 360b. The discharge and servicing of individual conveyor elements can take place, under the control of the open-loop and/or closed-loop control unit of the conveyor arrangement, depending on a measured coefficient of friction or abrasive wear of the plain bearings of the conveyor elements (cf. FIG. 5).

Figure 4:
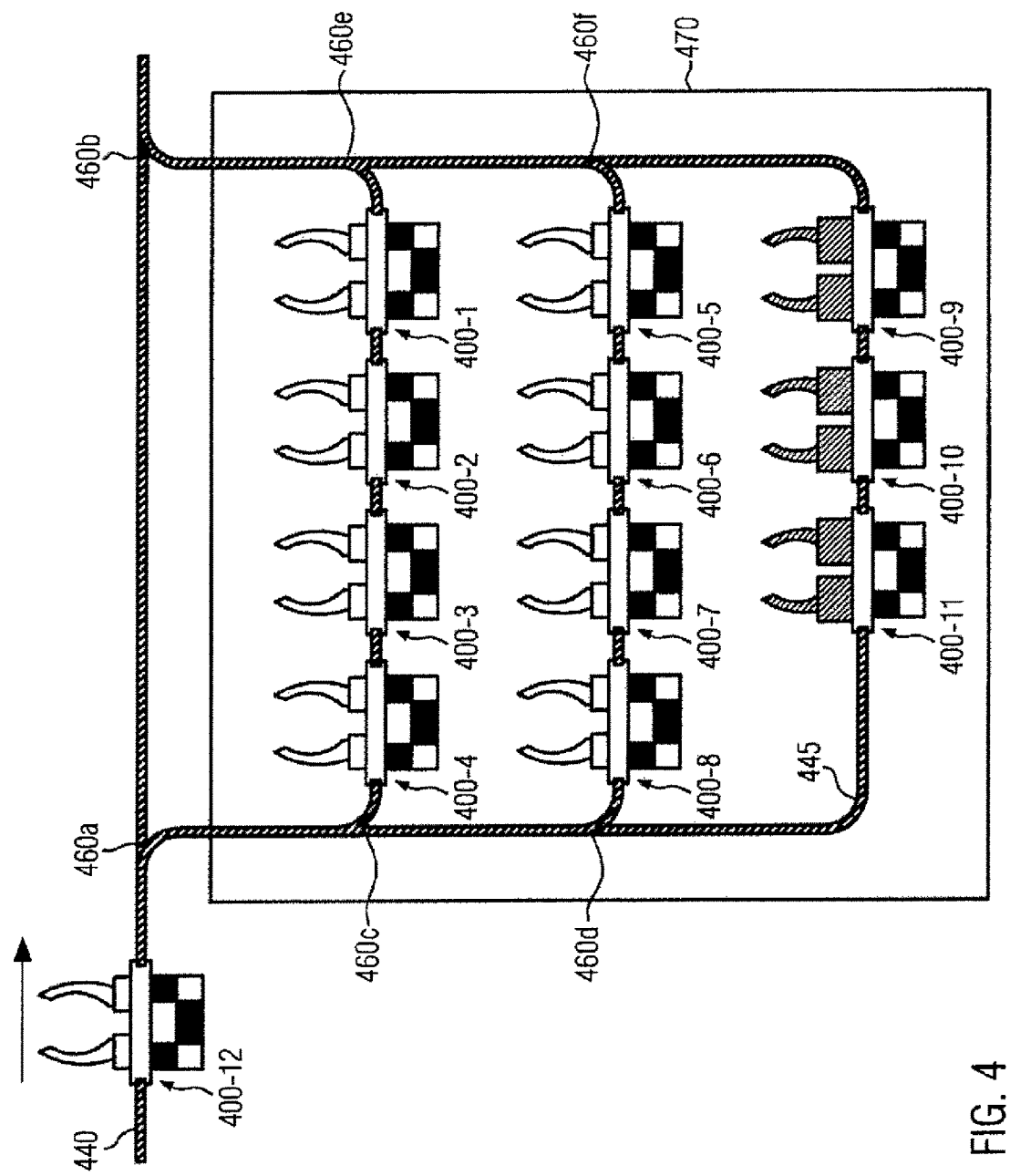
FIG. 4 shows a schematic diagram for a servicing device with a magazine for conveyor elements according to the present disclosure.

FIG. 4 schematically shows an alternative embodiment of a servicing device for conveyor elements, which comprises a magazine for conveyor elements. As has already been described more than once, the stream of conveyor elements 400-12 moves along the main line 440 of the conveyor track, and individual conveyor elements can be supplied, via a first track switch 460a and a secondary line 445, to the servicing device 470 arranged parallel to the main line. According to the special embodiment shown here, the servicing device 470 comprises a plurality of parallel branches for storing entire conveyor elements 400-1 to 400-11. Different branches may here stock the same type of conveyor elements 400-1 to 400-8 or different types of conveyor elements 400-9 to 400-11, e.g. with an alternative gripper element. If necessary, a conveyor element discharged from the main line may be replaced, via track switches 460c to 460f of the servicing device 470, by a conveyor element kept in stock in the magazine, said conveyor element being then introduced, via the second track switch 460b, into the stream of conveyor elements along the main line. When the discharged conveyor element is replaced by a conveyor element 400-9 to 400-11 with alternative format parts, e.g. gripper elements, a rapid product change can be carried out, controlled by the open-loop and/or closed-loop control unit of the conveyor arrangement. In particular, the whole number of conveyor elements circulating in the conveyor arrangement can rapidly be replaced by means of a magazine, which is adapted to be coupled to the servicing device as a module, by conveyor elements having other format parts adapted to a new product. Alternatively, such a magazine for conveyor parts allows, however, also a rapid replacement of a defective conveyor element by a new conveyor element. The defective conveyor element can subsequently be removed from the magazine and repaired manually or automatically.

Figure 5:
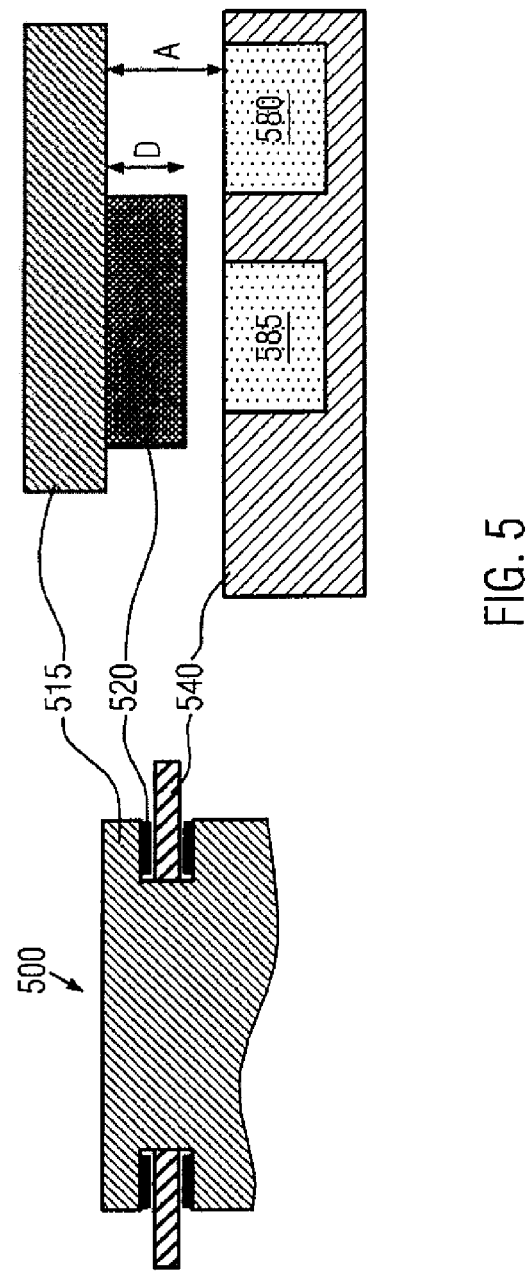
FIG. 5 shows a schematic diagram for an examination device with two sensors integrated in the conveyor track according to the present disclosure.

FIG. 5 shows exemplarily an examination device for determining the thickness or abrasive wear of a plain bearing of the conveyor elements according to the present disclosure. The here schematically shown conveyor element 500 comprises a plurality of plain bearings 520 provided on the housing 515 of the conveyor element and used for supporting the conveyor element on the guide rail 540. One of the plain bearings shown in FIG. 5 is, exemplarily, shown as being already partially worn, a circumstance that finds expression in a reduced thickness D of the plain bearing.

The examination device, which is here exemplarily shown, comprises a sensor 580 for measuring a distance A between the housing 515 and the guide rail 540 as well as a further sensor 585 for determining the thickness D of a plain bearing 520. Alternatively, the sensors shown may, however, also be arranged as part of the conveyor element and/or at other locations of the conveyor track. The measurement of the distance A by means of the sensor 580 may be carried out e.g. by laser triangulation or by means of an eddy current sensor. In the case of the latter, eddy currents can be induced in the housing 515 of the conveyor element by the sensor 580 via alternating magnetic fields, said eddy currents having, according to Lenz's law, a damping effect on the alternating fields generated by the sensor. The damping can be determined by measuring the induced currents and it can be used for determining the distance A, when the material of the housing 515 is known. Subsequently, direct conclusions with respect to the thickness of the plain bearing can be drawn from said distance A, in the event that the plain bearing abuts on the guide rail (other than shown in the present case). Alternatively, a sensor 585 can also be used for determining the thickness of the plain bearing directly, by determining, e.g. through laser triangulation, the thickness of the here shown gap between the guide rail and the plain bearing, or by determining by means of an optical system with image processing the abrasive wear of a two- or multi-colored plain bearing. Several alternative embodiments of the sensors 580 and 585 for determining the abrasive wear of a plain bearing are imaginable. Making use of the here shown sensors 580 and 585, the thickness of the plain bearing or plain bearings can be determined automatically whenever a conveyor element passes by. If the determined thickness of the plain bearing constituting a state parameter of the conveyor element deviates from a predetermined target state of the plain bearing, the open-loop and/or closed-loop control unit of the conveyor arrangement will be able to supply the respective conveyor element for automatic servicing, e.g. for replacement of the worn plain bearing, to a servicing device arranged downstream of the examination device. The early recognition of defective conveyor elements, in particular of worn bearing elements, leads to a decrease in the number of malfunctions and thus to an increase in the availability of the container treatment system. In addition, higher power consumption of the interaction elements of the conveyor track caused by a wear-induced higher coefficient of friction of the plain bearings can be avoided. Taking all this into account, a safe operation of the system can be guaranteed, without major operating efforts, in spite of the large number of conveyor elements that are typically circulating in a container treatment system.

Figure 6:
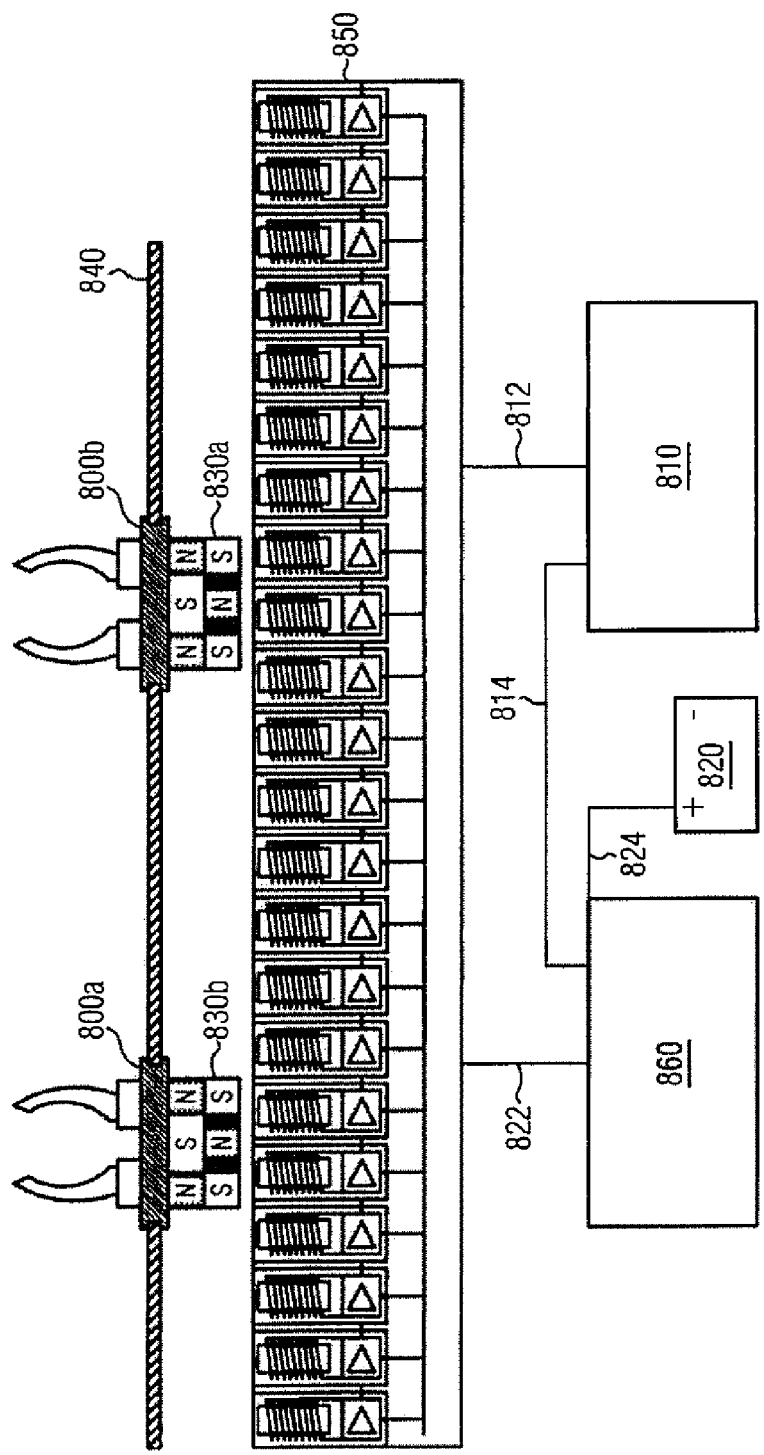
FIG. 6 shows a schematic diagram for an energy-buffered open-loop and/or closed-loop control circuit of a conveyor arrangement for individually controllable conveyor elements according to the present disclosure.

Finally, FIG. 6 shows a schematic diagram for a conveyor arrangement for conveying containers in a container treatment system by means of individually controllable conveyor elements with an energy-buffered open-loop and/or closed-loop control circuit according to the present disclosure. The exemplary, non-limiting representation shows exemplarily two conveyor elements 800*a* and 800*b*, which can be moved along the guide rail 840 due to magnetic interaction of their reaction elements 830*a* and 830*b*, respectively, with the interaction elements 850 of the conveyor track. To this end, a power supply 810 supplies power to the interaction elements 850 via a supply line 812 in the operating condition of the conveyor arrangement. In addition, the power supply 810 supplies energy also to an open-loop and/or closed-loop control unit 860 of an open-loop and/or closed-loop control circuit via an additional line 814. The open-loop and/or closed-loop control unit 860 controls by open-loop and/or closed-loop control the movement of the conveyor elements 800*a* and 800*b* by controlling the individual interaction elements 850 by means of a control line 822. In this respect, the amount of power required for operating the control electronics is generally much smaller than that required e.g. for supplying current to the electric coils of the interaction elements 850.

This is the reason for the fact that, according to the present disclosure, the open-loop and/or closed-loop control unit 860 is configured, in the example shown, as part of an energy-buffered open-loop and/or closed-loop control circuit, which is formed separately of the supply circuit of the interaction elements. In addition to the open-loop and/or closed-loop control unit 860 and the control line 822 as well as the control electronics for controlling the interaction elements 850, this open-loop and/or closed-loop control circuit may especially comprise sensors arranged along the conveyor track and used for determining the position of the conveyor elements. An emergency power supply 820 in the form of a battery, a rechargeable battery or a capacitor provides, via a separate supply line 824, buffering of the energy-buffered open-loop and/or closed-loop control circuit for a predetermined minimum period of time in the event that the power supply 810 should be interrupted, e.g. through switching off of the container treatment system or due to a power failure. During this minimum period of time, especially a residual movement of the conveyor elements 800*a* and 800*b* along the conveyor track resulting from inductances of the electric coils 850 of the conveyor track and/or the inertia of the conveyor elements will decrease, so that the open-loop and/or closed-loop control unit 860 can determine the final position of the now static conveyor elements by means of the sensors arranged along the conveyor track. In particular, the memory-programmable control unit 860 may comprise a memory unit (which is here not shown) in which the final positions and, optionally, the state parameters of the conveyor elements can be stored so that they can be read during a subsequent initialization routine of the conveyor arrangement. Storage of the final positions of the conveyor elements in the case of a failure of the power supply allows uninterrupted product tracking. In addition, a subsequent initialization will be much easier and can be accomplished much faster.

What is claimed is:

1. A conveyor arrangement for conveying containers in a container treatment system, comprising
   a conveyor track,
   at least one conveyor element movably arranged on the conveyor track and used for conveying one or a plurality of containers,
   a conveyor element servicing device connected to the conveyor track, and
   an open-loop and/or closed-loop control unit,
   the conveyor track and the conveyor element being configured such that the conveyor element can be guided along the conveyor track in an individually controllable manner by means of the open-loop and/or closed-loop control unit, and
   the open-loop and/or closed-loop control unit being configured to supply the conveyor element to the servicing device depending on at least one state parameter of the conveyor element, and
   the servicing device being connected to the conveyor track according to the First In-First Out, FIFO, principle.

2. The conveyor arrangement according to claim 1, wherein the conveyor element and at least a part of the conveyor track are configured such that, in the area of said part of the conveyor track, the conveyor element can be moved by means of a magnetic force.

3. The conveyor arrangement according to claim 2, and the conveyor element is moved by means of a magnetic force in interaction with the conveyor track.

4. The conveyor arrangement according to claim 1, and the conveyor element is supported on the conveyor track in one of a fully magnetic manner, a partly magnetic and a partly mechanical manner, and a fully mechanical manner.

5. The conveyor arrangement according to claim 1, further comprising:
the conveyor track comprises a main line and a secondary line,
the servicing device is arranged at the secondary line, and
the secondary line is connected to the main line via at least one track switch for discharging the conveyor element from the main line and/or for introducing the conveyor element into the main line.

6. The conveyor arrangement according to claim 1, further comprising:
the servicing device comprises at least one device of the group consisting of a cleaning device, a sterilization device, a lubricating device, a repair device, a reconfiguring device, a replacement device for wearing parts and a replacement device for format parts.

7. The conveyor arrangement according to claim 6, further comprising:
the replacement device for wearing parts and/or the replacement device for format parts comprises an assembly robot and a magazine for wearing parts and/or format parts, and
the assembly robot is configured for replacing a wearing part and/or a format part of the conveyor element automatically by a wearing part and/or a format part from the magazine.

8. The conveyor arrangement according to claim 1, further comprising:
the servicing device comprises a magazine for conveyor elements.

9. The conveyor arrangement according to claim 8, and the magazine for conveyor elements is coupled as a unit to the servicing device.

10. The conveyor arrangement according to claim 1, further comprising an examination device configured for determining the at least one state parameter of the conveyor element.

11. The conveyor arrangement according claim 10, and the examination device is arranged along a secondary line of the conveyor track.

12. The conveyor arrangement according to claim 10, further comprising:
the conveyor element is supported on the conveyor track in an at least partially mechanical manner,
the at least one state parameter comprises a degree of wear of a bearing element of the conveyor element,
the examination device comprises a part of the conveyor track, which includes a plurality of interaction elements and a plurality of sensors arranged along the conveyor track and used for determining a position of the conveyor element along the conveyor track, and a measurement device, and
the measurement device is configured for determining, by means of the interaction elements and/or sensors, a coefficient of friction for a movement of the conveyor element along the conveyor track.

13. The conveyor arrangement according to claim 12, and the plurality of sensors comprises magnetic field sensors.

14. The conveyor arrangement according to claim 10, further comprising:
the conveyor element is, at least partially, supported on a guide rail of the conveyor track by means of at least one plain bearing,
the at least one state parameter comprises a thickness of the plain bearing, an abrasive wear of the plain bearing, a distance between a housing of the conveyor element and the guide rail or a value for the amount of play of the plain bearing, and
the examination device comprises a part of the conveyor track, which includes at least one sensor for measuring the at least one state parameter.

15. The conveyor arrangement according to claim 14, and the one sensor for measuring the at least one state parameter provides one of mechanical, capacitive, inductive, and optical distance measurement, and a combination thereof.

16. The conveyor arrangement according to claim 10, further comprising:
the conveyor element is, at least partially, supported on a guide rail of the conveyor track by means of at least one roller bearing,
the at least one state parameter comprises a rotational speed of the roller bearing, a loudness level of a rolling noise of the roller bearing or a value for a heat emission of the roller bearing, and
the examination device comprises a part of the conveyor track, which includes at least one sensor for measuring the at least one state parameter.

17. The conveyor arrangement according to claim 16, and the at least one sensor for measuring the at least one state parameter comprises one of an optical camera, a piezoelectric sensor, a thermographic camera, a pyrometer, and a combination thereof.

18. The conveyor arrangement according to claim 10, and the examination device comprises a test station configured for testing a functional element of the conveyor element.

19. The conveyor arrangement according to claim 18, and the functional element of the conveyor element is a holding device for containers.

20. A conveyor arrangement for conveying containers in a container treatment system, comprising
a conveyor track,
at least one conveyor element movably arranged on the conveyor track and used for conveying one or a plurality of containers,
a conveyor element servicing device connected to the conveyor track, and
an open-loop and/or closed-loop control unit,
the conveyor track and the conveyor element being configured such that the conveyor element can be guided along the conveyor track in an individually controllable manner by means of the open-loop and/or closed-loop control unit, and
further comprising:
an energy-buffered open-loop and/or closed-loop control circuit, and
a plurality of sensors arranged along the conveyor track and used for determining a position of the at least one conveyor element along the conveyor track as part of the energy-buffered open-loop and/or closed-loop control circuit, the energy-buffered open-loop and/or closed-loop control circuit being configured to determine the position of the at least one conveyor element in the switched-off condition of the container treatment system.

21. The conveyor arrangement according to claim 20, and the open-loop and/or closed-loop control circuit further comprises a memory unit for storing a specific position.

22. The conveyor arrangement according to claim 20, and the open-loop and/or closed-loop control circuit is energy-buffered by an uninterruptible power supply, UPS.

23. The conveyor arrangement according to claim 20, and the plurality of sensors comprises magnetic field sensors.

24. A method for servicing a plurality of individually controllable conveyor elements for conveying containers in a container treatment system along a conveyor track, the plurality of conveyor elements being arranged so as to be movable on the conveyor track, comprising:
   automatically determining at least one state parameter of a conveyor element among a plurality of conveyor elements by an examination device,
   comparing the determined at least one state parameter with a predetermined target state of the conveyor element by means of an open-loop and/or closed-loop control unit,
   supplying the conveyor element to a servicing device that is arranged at the conveyor track, by moving the conveyor element along the conveyor track in the event that the determined at least one state parameter deviates from the predetermined target state, the movement of the conveyor element being controlled by means of an open-loop and/or closed-loop control unit, and
   executing at least one servicing process at the conveyor element by the servicing device,
   the determination of the at least one state parameter of the conveyor element comprising examination of the wear of a bearing element of the conveyor element and/or a function test of a functional element of the conveyor element.

25. The method according to claim 24, and the functional element comprises a container holding device.

26. The method according to claim 24, and the at least one state parameter is automatically determined at regular time intervals.

* * * * *